(12) United States Patent
Malvasi et al.

(10) Patent No.: US 7,691,936 B2
(45) Date of Patent: Apr. 6, 2010

(54) FINE FLUOROPOLYMER POWDERS

(75) Inventors: Marco Malvasi, Alessandria (IT);
Stefano Ferrero, Alessandria (IT);
Valeri Kapeliouchko, Alessandria (IT)

(73) Assignee: Solvay Solexis S.p.A., Milan (IT)

( * ) Notice: Subject to any disclaimer, the term of this patent is extended or adjusted under 35 U.S.C. 154(b) by 384 days.

(21) Appl. No.: 11/488,022

(22) Filed: Jul. 18, 2006

(65) Prior Publication Data
US 2007/0021551 A1 Jan. 25, 2007

(30) Foreign Application Priority Data
Jul. 21, 2005 (IT) .......................... MI2005A1397

(51) Int. Cl.
*C08L 27/12* (2006.01)

(52) U.S. Cl. .......................... 524/544; 524/87; 524/94; 524/127; 524/130; 524/157; 524/166; 524/210; 524/217; 524/556; 524/577; 524/545; 524/546

(58) Field of Classification Search ................ 524/544, 524/545, 546; 526/242, 565
See application file for complete search history.

(56) References Cited

U.S. PATENT DOCUMENTS

| | | | |
|---|---|---|---|
| 2,559,752 A | 7/1951 | Berry et al. | |
| 2,593,583 A | 4/1952 | Lontz et al. | |
| 3,037,953 A | 6/1962 | Barnard et al. | |
| 3,271,341 A | 9/1966 | Garrison, Jr. et al. | |
| 3,301,807 A | 1/1967 | Juzaemon | |
| 3,536,643 A | 10/1970 | Stryker et al. | |
| 3,704,272 A | 11/1972 | Holmes | |
| 3,933,734 A * | 1/1976 | Mark et al. ................ | 524/160 |
| 4,369,266 A | 1/1983 | Kuhls et al. | |
| 4,380,618 A | 4/1983 | Khan et al. | |
| 4,485,182 A * | 11/1984 | Enomoto et al. ............ | 501/151 |
| 4,714,748 A * | 12/1987 | Hoashi et al. .............. | 526/255 |
| 4,864,006 A | 9/1989 | Giannetti et al. | |
| 4,990,283 A | 2/1991 | Visca et al. | |
| 5,391,709 A | 2/1995 | Egres, Jr. et al. | |
| 5,789,508 A | 8/1998 | Baker et al. | |
| 5,990,330 A | 11/1999 | Sulzbach et al. | |
| 6,136,893 A | 10/2000 | Yamashita et al. | |
| 6,180,702 B1 * | 1/2001 | Chung et al. ............... | 524/161 |
| 6,218,015 B1 * | 4/2001 | Allen et al. ................ | 428/422 |
| 6,291,054 B1 * | 9/2001 | Thomas et al. ............. | 428/141 |
| 6,297,334 B1 | 10/2001 | Marchese et al. | |
| 6,479,581 B1 | 11/2002 | Ireland et al. | |
| 6,479,591 B2 | 11/2002 | Kapeliouchko et al. | |
| 6,518,352 B1 | 2/2003 | Visca et al. | |
| 6,576,703 B2 | 6/2003 | Kapeliouchko et al. | |
| 6,780,966 B2 * | 8/2004 | Wu et al. ................. | 528/502 F |
| 6,861,466 B2 * | 3/2005 | Dadalas et al. ............ | 524/544 |
| 2003/0153674 A1 | 8/2003 | Visca et al. | |
| 2003/0220442 A1 | 11/2003 | Epsch et al. | |
| 2005/0070659 A1 * | 3/2005 | Shiow-Ling et al. ........ | 524/502 |

FOREIGN PATENT DOCUMENTS

| | | |
|---|---|---|
| EP | 0 457 356 A2 | 11/1991 |
| EP | 1 279 681 A2 | 1/2003 |
| EP | 1 279 693 A2 | 1/2003 |
| EP | 1 155 055 B1 | 4/2003 |
| EP | 1 382 593 A2 | 1/2004 |
| FR | 2 804 438 A | 8/2001 |
| WO | 03/051988 A2 | 6/2003 |

OTHER PUBLICATIONS

Kirk Othmer; "Encyclopedia of Chemical Technology"; III ED., vol. 18; pp. 720-744; 1982.
Kirk Othmer; "Encyclopedia of Chemical Technology"; 1995; vol. 14; pp. 737-783; J. Wiley & Sons.

* cited by examiner

*Primary Examiner*—Mark Eashoo
*Assistant Examiner*—Nicole M Buie-Hatcher
(74) *Attorney, Agent, or Firm*—Arent Fox LLP

(57) ABSTRACT

Fine fluoropolymer powders substantially fluorinated surfactant free, in particular fluorinated ionic surfactants, preferably perfluorooctanoic acid or its salts, comprising an anionic polyelectrolyte.

16 Claims, No Drawings

FINE FLUOROPOLYMER POWDERS

The present invention relates to fluoropolymer coagulated powders substantially fluorinated surfactant free, in particular fluorinated ionic surfactant free.

More specifically the present invention relates to fluoropolymer coagulated fine powders substantially perfluorooctanoate free, either in the form of acid and its salts.

Fluoropolymer coagulated fine powders substantially fluorinated anionic surfactant free mean that the fluorinated surfactant content, referred to the fluoropolymer weight, is lower than 100 ppm, in particular lower than 50 ppm, more specifically lower than 5 ppm.

It is well known in the prior art that for the production of fluorinated polymers there are two different procedures of polymerization: the suspension polymerization and the emulsion polymerization. In suspension polymerization polymer granules having millimetric sizes are obtained. In emulsion polymerization a colloidal aqueous dispersion with particle diameters of the order from some nanometers, generally from 10 nm to 400 nm, is obtained. The emulsion polymerization process of fluoropolymers is carried out under a mild stirring and in the presence of surfactants not acting as chain transfer agents to avoid obtaining fluoropolymers having a low molecular weight and therefore with poor mechanical properties. These surfactants are called non telogenic surfactants, see for example U.S. Pat. No. 2,559,752. Salts of perfluoroalkanoic acids, in particular ammonium and/or alkaline metal of the perfluorooctanoic acid, indicated afterwards with PFOA, are industrially very often used. Other (per)fluorinated anionic surfactants are also used, see for example U.S. Pat. Nos. 3,271,341, 4,380,618, 4,864,006, 5,789,508. The PFOA is industrially the most used surfactant in the emulsion polymerization as it is not telogenic, thus allowing to obtain dispersions of fluorinated polymers with high molecular weight, and with long storage.

The fluoropolymer dispersions obtainable through an emulsion, or microemulsion polymerization process generally have the following characteristics:

particle diameter from 10 nm to 400 nm, preferably from 20 nm to 300 nm;
fluoropolymer concentration from 10% to 45% by weight, preferably from 20% to 35%;
amount of fluorinated anionic surfactant from 800 ppm to 200,000 ppm, preferably from 1,200 ppm to 6,000 ppm, referred to the polymer weight.

From the industrial point of view the polytetrafluoroethylene (PTFE) dispersions obtainable with an emulsion polymerization process typically have an average particle diameter from 180 nm to 400 nm, preferably from 200 nm to 300 nm, still more preferably from 220 nm to 280 nm. The amount of the fluorinated anionic surfactant ranges from about 2,500 ppm to about 5,000 ppm, preferably from 3,000 ppm to 4,000 ppm, referred to the polymer weight. Processes for obtaining polytetrafluoroetlylene (PTFE) dispersions having diameter between 10 nm and 100 nm, preferably between 20 nm and 80 nm, still more preferably between 30 nm and 70 nm, for example by microemulsion polymerization, are known in the prior art. See for example U.S. Pat. No. 6,297,334. Typically these dispersions contain an amount of fluorinated anionic surfactant from about 800 ppm to about 200,000 ppm, preferably from 1,200 ppm to 40,000 ppm referred to the polymer weight.

The fluoropolymer dispersions obtained from the emulsion or microemulsion polymerization process can be subjected to post-treatments, for example for obtaining concentrated fluoropolymer dispersions or for obtaining fine fluoropolymer powders. The concentrated fluoropolymer dispersions can be obtained for example by a decantation process, as described for example in U.S. Pat. Nos. 3,037,953, 3,704,272 and U.S. Pat. No. 3,301,807. Another concentration process of fluoropolymer dispersions is the so called ultrafiltration process, as described for example in U.S. Pat. No. 6,136,893 and U.S. Pat. No. 4,369,266.

For obtaining wet fine fluoropolymer powders the dispersion obtained from the emulsion polymerization process is coagulated and the powder obtained from the coagulation is called fine powder. See for example U.S. Pat. No. 2,593,583. The conventional coagulation process comprises the following steps:

optionally, dilution of the fluoropolymer dispersion with water and optional addition of a destabilizing electrolyte;
mechanical stirring of the dispersion for obtaining the formation of aggregates/gels;
granulation (coagulation) of the aggregates/gels by mechanical stirring;
separation of the fluoropolymer from the water by flotation;
mechanical separation of the wet fine powder from the coagulum water.

Then the wet fine powder is dried and transformed through other processes, for example by extrusion, to obtain end manufactured articles. It is known that, in the above described post-treatments of fluoropolymer dispersions, the fluorinated surfactants can go into the environment. In particular, in the post-treatment processes of the fine powders the fluorinated surfactants can be present in the coagulum and washing waters, or disperse in the atmosphere during the drying steps. Furthermore the fluorinated surfactants can still be present in the coagulated powder after drying. This can happen in particular when the fluoropolymer dispersions obtained by an emulsion polymerization process are used in the co-coagulation with fillers, in particular with inoganic fillers containing metal cations, for example barium, aluminum, titanium, bismuth. Most of the fluorinated anionic surfactant salts is charaterized by an extremely low volatility and their removal from the powder during the drying step is in practice impossible. It is to be noted that, in the post-treatment processes of the fine powders obtained by coagulation from fluoropolymer dispersions coming from the emulsion polymerization, the removal of fluorinated anionic surfactants is rather difficult when one operates at a low temperature in the drying step, lower than 130° C. Under these drying conditions anionic surfactant always remains in the fine powders. For eliminating the fluorinated surfactant it is necessary to operate at temperatures higher than 160° C. This has however the drawback to require higher drying temperatures and above all that the obtained fine powders cannot be used for preparing manufactured articles in low pressure extrusion lines. It is known indeed that fine powders dried at high temperature must be extruded at high pressures. Furthermore fluorinated anionic surfactants have been classified as dangerous for the environment and are characterized by a low bioelimination rate from the human body. For example the PFOA seems to belong to the surfactants particularly harmful for the environment and with long residenece times in men. Therefore there is a need from the users of fine fluoropolymer powders substantially fluorinated anionic surfactant free, in particular PFOA free.

There is also the need of post-treatment processes for obtaining fine fluoropolymer powders capable to limit or completely eliminate the emissions in the environment of the fluorinated surfactants. Processes for the removal of fluorinated surfactants, in particular PFOA, from the gaseous effluents of drying of coagulated wet powders of fluoropolymers, are known in the prior art. This can be carried out, for example, by bubbling the drying smokes through an alkaline water solution. The fluorinated surfactants are then recovered from said solution by precipitation or by concentration, for example by a reverse osmosis process. See for example EP 1,382,593 and U.S. Pat. No. 5,990,330. The drawback of said processes is that the plants for their running are expensive and need besides a remarkable consumption of energy, for example, to maintain pipes at a temperature sufficient to avoid the smoke condensation and thus the accumulation of fluorinated surfactants inside the pipes. Furthermore the removal efficiency normally does not reach 100%.

Processes for removing fluorinated anionic surfactants, in particular PFOA, from fluoropolymer dispersions wherein the fluoropolymer dispersion is stabilized with a nonionic surfactant and then subjected to purification processes, are known in the prior art. See for example U.S. Pat. No. 3,536,643, EP 1,155,055 and patent applications WO 03/051,988, US 2003/0,220,442. It has been found by the Applicant that said dispersions, once purified from fluorinated anionic surfactants, are rather hardly coagulable or even non coagulable and therefore cannot in practice be used for obtaining coagulated fine powders.

The need was therefore felt to have available fine fluoropolymer powders, obtainable from fluoropolymer dispersions coming from an emulsion polymerization process, having the following combination of properties:

substnatially fluorinated surfactant free, as above, in particular fluorinated ionic surfactant free;

co-coagulable with fillers both of inorganic and organic type, for obtaining co-coagulated powders substantially fluorinated surfactant free, in particular fluorinated ionic surfactant free;

obtainable by coagulation with the usual known methods of the prior art for the fluoropolymer dispersions, without the need of plant modification.

The Applicant has found fine fluoropolymer powders solving the above technical problem.

It is an object of the present invention fine fluoropolymer powders substantially fluorinated surfactant free, in particular fluorinated ionic surfactants, preferably perfluorooctanoic fluorooctanoic acid or its salts, comprising an anionic polyelectrolyte.

The fine powders of the present invention contain fluoropolymers selected from one or more of the following classes:

tetrafluoroethylene (TFE) homopolymers and TFE copolymers with monomers having at least one unsaturation of ethylene type;

TFE-based thermoprocessable fluoropolymers (from the melt), such as Pcore ceramic-metallic FA, MFA, FEP and ETFE;

VDF-based homopolymers and copolymrs;

CTFE-based homopolymers and copolymers, for example PCTFE and E/CTFE copolymer;

VDF-based fluoroelastomers:

VDF/HFP, optionally containing TFE and/or vinylethers selected from perfluoroalkylvinylethers and/or perfluoroalkoxyalkylvinylethers; optionally containing hydrogenated olefins as ethylene and propylene;

TFE-based (per)fluoroelastomers:

TFE copolymes with vinylethers selected from perfluoroalkylvinylethers and/or perfluoroalkoxyalkylvinylethers; in particular TFE/PMVE, TFE/PEVE, TFE/PPVE;

TFE copolymers with hydrogenated olefins, preferably ethylene and/or propylene;

amorphous and/or crystalline fluoropolymers of TFE and/or VDF containing dioxole rings having 5-7 atoms, in particular those obtained by copolymerization with (per)fluorodioxoles or with dienic monomers giving dioxole rings by cyclization.

Copolymers of tetrafluoroethylene (TFE) with monomers having at least one unsaturation of ethylene type comprise hydrogenated and fluorinated comonomers. The comonomer amount is preferably lower than 3% by weight, preferably lower than 1% to have non thermoprocessable copolymers (the so called modified PTFE).

Among the hydrogenated comonomers, that is comonomers not containing fluorine, ethylene, propylene, acrylic monomers, for example methylmethacrylate, (meth)acrylic acid, hydroxyethylenacrylate, styrene monomes such as styrene, can be mentioned.

Among the fluorinated comonomers it can be mentioned:

$C_3$-$C_8$ perfluoroolefins, such as hexafluoropropene (HFP);

$C_2$-$C_8$ hydrogenated fluoroolefins, as vinyl fluoride (VF), vinylidene fluoride (VDF), trifluoroethylene, $CH_2=CH-R_{f0}$ perfluoroalkylethylene, wherein $R_{f0}$ is a $C_1$-$C_6$ perfluoroalkyl;

$C_2$-$C_6$ chloro- and/or bromo- and/or iodo-fluoroolefins, as chlorotrifluoroethylene (CTFE);

$CF_2=CFOR_{f0}$ (per)fluoroalkylvinylethers (PAVE), wherein $R_{f0}$ is a $C_1$-$C_6$ (per)fluoroalkyl, for example $CF_3$, $C_2F_5$, $C_3F_7$;

$CF_2=CFOX_0$ (per)fluoro-oxyalkylvinylethers, wherein $X_0$ is a $C_1$-$C_{12}$ alkyl or a $C_1$-$C_{12}$ oxyalkyl or a $C_1$-$C_{12}$ (per)fluorooxyalkyl having one or more ether groups, for example perfluoro-2-propoxy-propyl;

fluorodioxoles, preferably perfluorodioxoles.

The preferred fluoropolymers are the TFE copolymers or the TFE homopolymers.

The fine powders of fluoropolymers of the invention are obtainable from fluoropolymer dispersions prepared by emulsion or microemulsion polymerization.

The emulsion polymerization processes are described in the following patents: U.S. Pat. Nos. 2,559,752, 4,380,618, 5,789,508, 6,479,591, 6,576,703 and in patent application US 2003/0,153,674.

The microemulsion polymerization processes are described in the following patents in the name of the Applicant: U.S. Pat. No. 4,864,006 and U.S. Pat. No. 6,297,334. The microemulsions usable in microemulsion polymerization processes are described in U.S. Pat. No. 4,864,006 and U.S. Pat. No. 4,990,283.

The fluoropolymer dispersion can be monomodal or bi- or multimodal. For the bi- and multimodal dispersions see for example U.S. Pat. Nos. 6,576,703, 6,518,352 in the name of the Applicant.

The fluoropolymer dispersion of the present invention can therefore derive from a dispersion obtained from emulsion polymerization, from a dispersion obtained from microemulsion polymerization, or a mixture of the aforesaid dispersions.

The anionic polyelectrolytes contained in the fine powders of fluoropolymers of the present invention are anionic polymers, having a linear or branched structure, with anionic groups distributed along the polymeric chain, optionally present also in the chain end groups. The polyelectrolytes generally have an equivalent weight, defined as molecular weight/number of anionic groups present in the polyelectrolyte, higher than 150, preferably higher than 200, still more preferably higher than 250, in particular higher than 300. The equivalent weight of the anionic polyelectrolytes usable in the process of the present invention is generally lower than 50,000, preferably lower than 10,000, still more preferably lower than 3,000.

Preferably the equivalent weight of the anionic polyelectrolytes is higher than 150 and lower than 2,000.

The number average molecular weight of the anionic polyelectrolytes is higher than 500, preferably higher than 1,000. The molecular weight of said anionic polyelectrolytes is generally lower than 1,000,000.

Said anionic polyelectrolytes contain in the molecule a number of anionic functional groups higher than or equal to 2, generally higher than or equal to 5. The anionic groups present in the molecule of the anionic polyelectrolytes are preferably selected from carboxylates, sulphates, sulphonates, phosphates, phosphonates; more preferably carboxylates, sulphates, sulphonates, still more preferably carboxylates.

Said anionic polyelectrolytes generally do not contain fluorine atoms.

Preferably the anionic polyelectrolytes are selected from anionic homopolymers or copolymers of monomers selected from acrylic or vinylic monomers and containing a number of anionic groups as indicated above, capable to give the equivalent weight as defined above.

As acrylic comonomers it can for example be mentioned: (meth)acrylamide; (meth)acrylic acid in the form of the corresponding salts; (meth)acrylonitrile, linear or branched $C_1$-$C_4$ hydroxyesters of the (meth)acrylic acid, as, for example, hydroxyethyl(meth)acrylate, hydroxypropyl(meth)acrylate, hydroxybutyl(meth)acrylate; $C_1$-$C_{12}$ alkyl(meth)acrylates, wherein the alkyl can be linear or branched, as, for example, methyl(meth)acrylate, ethyl(meth)acrylate, propyl(meth)acrylate, isopropyl(meth)acrylate, butyl(meth)acrylate, 2-ethylhexyl-(meth)acrylate, and the compounds of the following general formula:

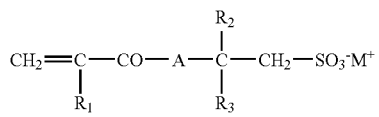

wherein: $R_1$ is H or $CH_3$; $R_2$ and $R_3$, equal or different, are H or $C_1$-$C_8$, alkyl, optionally branched; M is an alkaline or alkaline-earth metal or ammonium and A is NH, O, or $NCH_3$.

Among the vinyl monomers the following monomers can be mentioned: vinylaromatic monomers, as styrene and its derivatives obtained by substituting one or more hydrogen atoms of the aromatic ring with a hydroxyl or a methyl and/or of vinyl with a methyl, for example α-methylstyrene; $C_1$-$C_{12}$ alkyl vinylethers, as methyl-, ethyl-, n-propyl-, isopropyl-, n-butyl-, isobutyl- and 2-ethylhexyl-vinyl ether; vinyl esters of $C_1$-$C_{18}$ aliphatic monocarboxylic acids, as vinyl acetate, vinyl propionate, vinyl butyrate, vinyl 2-ethyl-hexanoate, vinyl stearate.

Said homopolymers or copolymers of one or more monomers selected from acrylic or vinylic monomers are obtainable by aqueous suspension polymerization by radical or ionic addition, according to known methods of the prior art. See for example Kirk Othmer "Encyclopedia of Chemical Technology", III Ed., vol. 18, pages 720-744. In case of radical aqueous suspension polymerization, as radical initiators those soluble in monomers are preferably used, and besides suspending agents, surfactants are used.

As radical initiators, aliphatic and aromatic peroxides are for example used, as, for example, t-butylperoxy-2-ethylhexanoate, dibenzoylperoxide, benzoylperoxide, laurylperoxide, t-butylperoxydiethylacetate or unstable azocompounds as azodiisobutyronitrile. In the monomeric mixture also a chain transfer agent can optionally be used. For example mercaptan compounds can be mentioned, as mercaptoethanol, mercaptopropanol, mercaptobutanol, mercaptoacetic acid, mercaptopropionic acid, butylmercaptan, n-dodecylmercaptan. The polymerization temperatures are those at which the decomposition of the initiator takes place, and are generally from 50° C. to 120° C. For the suspending agents see for example EP 457,356.

Other usable anionic polyelectrolytes are polyamic acids, preferably aroamtic polyamic acids or polyamidoamic acids. Examples of repeating units of these polymers are:

amido-amic acid:

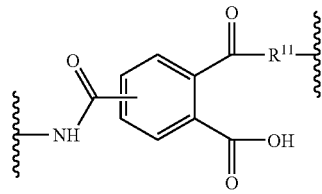

amidoimidic unit:

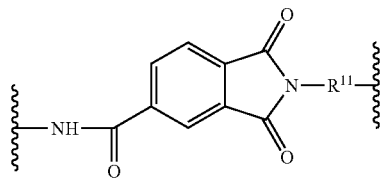

wherein $R^{II}$ is a divalent arylene radical. See for example U.S. Pat. No. 6,479,581.

For the preparation of these polymers see U.S. Pat. No. 6,479,581.

Other usable anionic polyelectrolytes are carboxyalkyl celluloses, wherein the alkyl comprises from 1 to 5 carbon atoms, preferably from 1 to 3, for example carboxymethylcellulose can be mentioned.

The polyelectrolytes usable for obtaining the fine powders of the present invention are for example those known with the commercial name Craymul® 8212 (Cray Valley), Torlon® AI30 (Solvay Advanced Polymers), Torlon® AI50 (Solvay Advanced Polymers).

The anionic polyelectrolytes contained in the fine fluoropolymer powders according to the present invention are generally selected from those soluble in water, optionally in the presence of co-solvents miscible with water, as alcohols, for example isopropyl alcohol, ketones, as N-methylpyrrolidone.

The fine fluoropolymer powders according to the present invention generally contain from 0.1% to 10%, preferably from 0.2% to 5%, still more preferably from 0.5% to 3% of polyelectrolyte, referred to the fluoropolymer weight.

Fine fluoropolymer powders substantially fluorinated surfactant free mean, as said, that the content of fluorinated surfactants, referred to the fluoropolymer weight, is lower than 100 ppm, in particular lower than 50 ppm, more particularly lower than 5 ppm.

The fine powders of the present invention, when desired, can also be available substantially without polyelectrolyte. This can be obtained by subjecting the fine powders to known post-treatment processes, for example drying, at temperatures at which the polyelectrolyte decomposes.

Said fine fluoropolymer powders substantially fluorinated surfactant free and comprising an anionic polyelectrolyte are obtainable from fluoropolymer dispersions coming from an emulsion or microemulsion polymerization process by a process comprising the following steps:
a) addition of an anionic polyelectrolyte to the fluoropolymer dispersion containing fluorinated surfactants;
b) contact of the dispersion obtained in a) with an anionic exchanger;
b1) separation of the dispersion from the anionic exchanger and recovery of a dispersion substantially fluorinated anionic surfactant free;
c) optional dilution of the dispersion obtained in b1) with water; stirring of the dispersion and optional addition of a destabilizing electrolyte for obtaining aggregates/gels; granulation (coagulation) of the aggregates/gels by stirring, and separation of the fine fluoropolymer powder from water by flotation;
d) optionally, washing with water;
e) drying of the fine powder.

Preferably, before step a) the pH of the fluoropolymer dispersion is adjusted at a pH value in the range from 7 to 12, preferably from 8 to 10. The base used can be a strong or weak, organic or inorganic, base; preferably an inorganic base is used, still more preferably an ammonia aqueous solution.

The fluoropolymer dispersion used as starting dispersion in the process of the present invention, as said, is obtained by an emulsion and/or microemulsion polymerization process. The fluoropolymer concentration is generally between 10% and 45%, preferably between 20% and 35%.

The anionic polyelectrolytes usable in step a) have been defined above, one or more polyelectrolytes of the above classes can be used. The polyelectrolyte is added in an amount generally comprised from 0.1% to 10%, preferably from 0.2% to 5%, still more preferably from 0.5% to 3%, in per cent by weight referred to the fluoropolymer weight. The amount of polyelectrolyte generally depends on the type of polyelectrolyte used. By routine tests one can easily determine the minimum amount sufficient to obtain the results of the invention and not to have fluoropolymer losses, for example by coagulation, during the treatment on anionic exchangers (step b) of the process of the invention.

Among the ionic exchangers usable in step b) of the process of the invention the anionic exchange resins described in "Kirk-Othmer—Encyclopedia of Chemical Technology", vol. 14, pages 737-783, J. Wiley & Sons, 1995 can be mentioned. Among the preferred anionic exchange resins, the resins containing a tertiary or quaternary ammonium group can be mentioned. Among the preferred commercial resins Amberjet®4400 OH (Rohm&Haas) and Dowex®MSA 1-C (Dow) can be mentioned.

The ionic exchange resins can be strongly basic, average basic, weakly basic type. A strongly basic resin is preferably used.

Step b) can be carried out in a continuous or discontinuous way, preferably in a discontinuous way. For example step b) can be carried out by addition of the anionic exchanger, under the form of granules having sizes of about 300-400 µm. The amount added is generally of the order from 1% to 10% by weight with respect to the dispersion weight. In the discontinuous process the mixture formed of the fluoropolymer dispersion containing the polyelectrolyte and the ionic exchange resin is stirred, for exampel in a tank, for a time sufficient to remove the fluorinated surfactant at the desired value, for example lower than 5 ppm, and then the fluoropolymer dispersion is separatd from the resin, for example by filtration.

Another embodiment of step b) is that to pass the fluoropolymer dispersion on a column filled with the ionic exchange resin of step b). In this kind of embodiment a continuous way is preferably used.

In a continuous process, the fluoropolymer dispersion from which the fluorinated surfactant has to be removed is fed through a column filled with the ionic exchange resin, or through more columns in series. The process can be repeated one or more times until reaching the desired value of the fluorinated surfactant. It is also possible to operate with a semicontinuous process, wherein the mixture formed of the fluoropolymer disperion to be treated and the ionic exchange resin, charged into a tank kept under stirring, is maintained under stirring for a time sufficient to reduce the fluorinated surfactant at the desired value. Then the fluoropolymer dispersion is discharged from the tank and contemporaneously separated, for example by filtrtion, from the resin and a new dispersion to be treated is added to the tank.

In step b) the contact time between the polymeric dispersion and the anionic exchanger is generally lower than 24 hours, preferably lower than 8 hours, still more preferably lower than 4 or 2 hours; the temperature is generally between 5° C. and 45° C.

In step c) the obtainment of the coagulated fine powder of the fluoropolymer comprises the following steps:
optional dilution of the dispersion obtained in b1), said dilution being carrried out when the concentration of the fluoropolymer dispersion obtained in b1) is higher than about 25% by weight of fluoropolymer; the concentration of the fluoropolymer in the dispersion used in step c) being preferably from 2% to about 25% by weight of fluoropolymer, still more preferably from 8% to 20%; when the dilution is carried out, it is preferable that the temperature of the diluted dispersion is from 5° C. to 35° C., preferably from 15° C. to 30° C.; optionally, and preferably, at the end a filtrtion of the diluted dispersion is carried out to eliminate the particle aggregates possibly present;
subseqeunt stirring, preferably mechanical, of the latex by using a specific power from 0.5 to 10 kW/m$^3$, optional addition of an acid destabilizing electrolyte to have the formation of a gel phase;
stirring, preferably mechanical, of the obtained gel by using a specific power from 1.5 to 10 kW/m$^3$; the stirring is maintained until the complete granulation and flotation of the fine powder;
stirring interruption and separation of the aqueous phase underlying the floated fine powder.

The destabilizing electrolyte optionally used in step c) is an acid electrolyte, preferably nitric acid, and the obtained dispersion has a pH from 0 to 3.5, preferably from 1 to 3.

The obtained fine powder is subjected to the successive drying phase e) in an aerated oven. The oven material must be resistant to the acid vapours developing under the drying conditions.

As said, with the process of the invention, the fine powders of fluoropolymers substantially result fluorinated anionic surfactant free already before drying.

The fine powders of the present invention are obtained without substantial fluoropolymer loss. As a matter of fact no formation of coagulum is observed during the removal of fluorinated anionic surfactants by contact of the dispersion with the anionic exchanger. Furthermore the polyelectrolyte used substantially remains in the fluoropolymer powder.

A further object of the present invention are fine fluoropolymer powders as above comprising organic and/or inorganic fillers. Said powders are generally called filled powders.

The organic and/or inorganic fillers ar for example:

inorganic salts, as, for example, barium sulphate, molybdenum sulphide, bismuth subcarbonate $(BiO)_2CO_3$, inorganic oxides, as, for example, aluminum oxide and titanium dioxide, bismuth oxide, glass, as glass fiber or hollow glass spheres;

carbon, in particular carbon made conductive;

polymers, such as polyamides, polyamidoimides, polyimides, polyphenylsulphide (PPS), oxidized polyphenylensulphide (PPSO2), polyethersulphone (PES), fluorinated polymers.

Preferably the amount of organic and/or inorganic fillers is generally between 1% and 60%, preferaby between 3% and 20%, referred to the fluoropolymer weight substantially fluorinated surfactant free.

The filled powders are obtainable by using the above process for obtaining the fine powders of the present invention, but adding in step c), before the coagulation, to the fluoropolymer dispersion substantially fluorinated anionic surfactant free at least one organic and/or inorganic filler, preferably under the form of powder or suspension, for example an aqueous suspension. It is thus possible to obtain, at the end of step c), co-coagulated powders. The latter are substantially fluorinated anionic surfactant free already before the drying step.

The results obtained with the process of the invention are surprising and unexpected as one would have expected that the anionic: polyelectrolyte would have been removed from the dispersion during the contact with the anionic exchange resins, likewise to what happens for the anionic fluorinated surfactant present in the starting dispersion so causing the coagulation of the dispersion.

The fine powders of the present invention are obtainable with high productivity and substantially without fluoropolymer loss.

The fine fluoropolymer powders of the present invention substantially fluorinated ionic surfactant free can be utilized in the usual fluoropolymer applications, for example for obtaining final manufactured articles by lubricated extrusion.

The co-coagulated powders of the invention show a very good homogeneity and an optimal distribution of the filler. This represents an advantage with respect to the physical powder mixing. From the application point of view, this represents a remarkable advantage as the obtained results are clearly superior than those of the physical mixing. As improved properties which can be mentioned there are the wear resistance, improved lubrication at high and low loads, in particular when the load is molybdenum sulphide. Besides the manufactured articles obtained by using the co-coagulated products of the invention show a smooth surface, while the manufactured articles obtained with mixed fine powders show rough surface. This is extremely important, for example, in the pharmaceutical application field, as rough surfaces could retain certain components rather than others, or represent sites wherein bacteria can grow.

The following Examples illustrate with non limitative purposes the present invention.

EXAMPLES

The percentages reported in the Examples are percentages by weight, where not otherwise indicated.

The PFOA is detrmined by gaschromatography.

Stretching Test
The test is carried out according to the ASTM D 4898-98 method.

Apparent Density
The test is carried out according to the ASTM D 1895-69 method.

Granulometry
The test is carried out according to the ASTM D 1921 method, A Method.

Example 1

Emulsion Polymerization 11 grams of the aqueous solution of ammonium perfluorooctanoate having a 100 g/litre concentration and 31 litres of demineralized water accurately degassed are fed in a 50 litre autoclave equipped with mechanical stirrer and previously put under vacuum. In the reactor also 140 grams of paraffin with softening point between 52° C. and 54° C. were previously introduced. The autoclave is kept under mechanical stirring and is pressurized with TFE up to a pressure of 20 bar at a temperature of 68° C. At this point 500 ml of a solution of $(NH_4)_2S_2O_8$ (APS) and disuccinic peroxide (DSAP) corresponding to 400 mg of APS and 2,000 mg of DSAP are fed into the autoclave.

When the pressure in the reactor has decreased of 0.5 bar, one starts to feed TFE by means of a compressor so as to maintain a constant pressure of 20 bar inside the reactor. In the meantime the reactor internal temperature is increased up to 78° C. at a rate of 0.5° C./min. During the reaction 50.6 grams of the aqueous solution at 100 g/litre of ammonium perfluorooctanoate are fed into the autoclave. After 90 minutes the TFE feding is interrupted, when 15,800 g of TFE have reacted, the reactor evacuated and cooled. The discharged latex has a solid content equal to 30% w/w and the pH is equal to 3.9.

The average diameter of the primary particle of polymer measured via Laser Light Scattering (LLS) results equal to 240 nm.

The PFOA content is 3,900 ppm based on the polymer.

Example 2

Preparation of an Aqueous Solution of an Acrylic Polyelectrolyte (Craymul® 8212-CrayValley®)

Starting from a commercial sample of aqueous dispersion having pH 3.0-4.0 at 40% by weight of acrylic polyelectrolyte (Craymul® 8212), having molecular weight of about 100,000 and equivalent weight about 450, a limpid and homogeneous solution at 5% by weight is prepared by addition of water and of an aqueous ammonia solution and under stirring. The pH of said solution is about 9.

Example 3

Starting from 40 kg of the dispersion obtained according to the Example 1, whose pH has been adjusted at about 9 with an aqueous ammonia soultion, and from the aqueous solution of Craymul® 8212 obtained according to the Example 2, a dispersion sample containing 0.25% of Craymul® 8212, referred to the PTFE weight, is prepared by mixing in a glass reactor equipped with discharge valve on the bottom. The PTFE content of the so obtained sample is equal to 29.6% by weight. To said sample 5% by weight of ionic exchange resin Amberjet® 4400 OH, referred to the sample weight, is added. The mixture is maintained under weak stirring with a two-blade mechanical stirrer for 8 hours. At the end-the dispersion, which appears fluoropolymer coagulum free, is separated from the resins by filtration through a 150 µm mesh net. The PTFE content of the obtained dispersion is equal to 29.6% in peso. The PFOA content, referred to the PTFE content, is lower than 5 ppm.

Example 4

Obtainment of a Coagulated Fine Powder According to the Invention.

In a 50 litre reactor the dispersion obtained according to the Example 3, previously filtered with a 150 µm mesh nylon net, is diluted with demienralized water until obtaining about 22 litres of latex with concentration equal to 160 g/l (14.5 % by weight) at a temperature of 20° C. The mixture is added under mechanical stirring (specific power 3 kW/m$^3$) to a solution at 20% by weight of HNO$_3$, in an amount such as to bring the latex pH to 3. The mechanical stirring causes the aggregation of the colloidal particles. There is initially gelling, then granulation and lastly flotation of the coagulated powder. The obtained fine powder is washed with demineralized water, separated from the water and dried for 40 hours at 115° C. A powder having apparent density equal to 450 g/l and granulometry ($d_{50}$) equal to 475 µm is obtained. The PFOA content, referred to the dried polymer, is lower than 5 ppm. The stretching test on the tape obtained from the coagulated powder has given a result of 1,500%.

Example 5 (Comparative)

Obtainment of a Coagulated Fine Powder According to the Prior Art.

In a 50 litre reactor the dispersion obtained according to the Example 1, previously filtered with a 150 µm mesh nylon net, is diluted with demineralized water until obtaining about 22 litres of latex with concentration equal to 160 g/l (14.5% by weight) at a temperature of 20° C. The mixture is added under mechanical stirring (specific power 3 kW/m$^3$) to a solution at 20% by weight of HNO$_3$, in an amount such as to bring the latex pH to 3. The mechanical stirring causes the aggregation of colloidal particles. There is initially gelling, then granulation and lastly flotation of the coagulated powder. The obtained fine powder is washed with demineralized water, separated from the water and dried for 40 hours at 115° C. A powder having apparent density equal to 480 g/l and granulometry ($d_{50}$) equal to 520 µm is obtained. The PFOA content, referred to the dried polymer, is equal to 20 ppm. The remaining PFOA which is not in the powder, is in the gaseous effluents and therefore it is to be recovered with the suitable processes as smokes containing PFOA cannot be discharged in the atmosphere. The stretching test on the tape obtained from the coagulated powder has given a result of 1,500%.

Comments to the Examples 4 and 5 (Comparative)

The results obtained with the stretching test in the Examples 4 and 5 (comparative) show that the fine powders of the invention are usable for the same application of the conventional fine powders (Example 5 (comparative)). The PFOA data of the Example 5 (comparative) show that the fine powder contains PFOA.

Example 6

Obtainment of a Co-Coagulated Fine Powder According to the Invention.

In a 50 litre reactor the dispersion obtained according to the Example 3, previously filtered with a 150 µm mesh nylon net, is diluted with demineralized water until obtaining about 18 litres of latex with concentration equal to 205 g/l (18.4% by weight) at a temperature of 20° C. To the latex BaSO$_4$ (Blanc Fixe Submicron Solvay Bario and Derivati S.p.a.) is added, under stirring, in the form of aqueous suspension having concentration equal to 12% by weight, in an amount equal to 10% of BaSO$_4$ with respect to the PTFE weight. The mechanical stirring causes the simultaneous aggregation of the colloidal PTFE and BaSO$_4$ particles. There is initially gelling, then granulation and lastly flotation of the co-coagulated powder. The so obtained co-coagulated fine powder is washed with demineralized water, separated from the water and dried for 32 hours at 160° C. The PFOA content, referred to the dried polymer, is lower than 5 ppm.

Example 7 (Comparative)

Obtainment of a Co-Coagulated Fine Powder According to the Prior Art.

In a 50 litre reactor the dispersion obtained according to the Example 1, previously filtered with a 150 µm mesh nylon net, is diluted with demineralized water until obtaining about 18 litres of latex with concentration equal to 205 g/l (18.4% by weight) at a temperature of 20° C. To the latex BaSO$_4$ is added, under stirring, in the form of aqueous suspension having concentration equal to 12% by weight, in an amount equal to 10% of BaSO$_4$ with respect to the PTFE weight. The mechanical stirring causes the simultaneous aggregation of the colloidal PTFE and BaSO$_4$ particles. There is initially gelling, then granulation and lastly flotation of the co-coagulated powder. The so obtained co-coagulated fine powder is washed with demineralized water, separated from the water and dried for 32 hours at 160° C. The PFOA content, referred to the dried polymer, is equal to 2,200 ppm.

Example 8 (Comparative)

Treatment of the Polymeric Dispersion with Resins According to the Prior Art.

Starting from 40 kg of the dispersion obtained according to the Example 1, the pH of which has been adjusted at about 9 with an aqueous ammonia solution, and from an aqueous solution of Triton® X100 at 5% by weight, a dispersion sample containing 0.25% of Triton® X100, referred to the PTFE weight, is prepared by mixing in a glass reactor equipped with discharge valve on the bottom. The PTFE content of the so obtained sample is equal to 29.6% by weight. To said sample 5% by weight of ionic exchange resin Amberjet® 4400 OH is added, referred to the sample weight. The mixture is maintained under weak stirring with a two blade mechanical stirrer for 8 hours. At the end the dispersion appears completely coagulated on the resins and cannot therefore be processed for obtaining a fine powder.

Example 9 (Comparative)

Treatment of the Polymeric Dispersion with Resins According to the Prior Art.

Starting from 40 kg of the dispersion obtained according to the Example 1, the pH of which has been adjusted at about 9 with an aqueous ammonia solution, and from an aqueous solution of Triton® X100 at 5% by weight, a dispersion sample containing 2% of Triton® X100, referred to the PTFE weight, is prepared by mixing in a glass reactor equipped with discharge valve on the bottom. The PTFE content of the so obtained sample is equal to 26.8% by weight. To said sample 5% by weight of ionic exchange resin Amberjet® 4400 OH is added, referred to the sample weight. The mixture is maintained under weak stirring with a two blade mechanical stirrer for 8 hours. At the end the dispersion, which appears fluoropolymer coagulum free, is separated from the resins by filtration through a 150 μm mesh net. The PTFE content of the obtained dispersion is equal to 26.8% by weight. The PFOA content, referred to the PTFE weight, is lower than 5 ppm.

An aliquot of the so obtained dispersion is diluted with demineralized water in a 50 litre reactor until obtaining about 22 litres of latex with a concentration equal to 160 g/l (14.5% peso) at a temperature of 20° C. The mixture is added under mechanical stirring (specific power 3 kW/m$^3$) to a solution at 20% by weight of HNO$_3$, in an amount such as to bring the latex pH to 3. It is not possible to obtain a coagulated powder.

The invention claimed is:

1. A process for obtaining the fine powders of fluoropolymers substantially fluorinated surfactant free, comprising an anionic polyelectrolyte,
   wherein the process comprises the following steps:
   a) addition of an anionic polyelectrolyte to the fluoropolymer dispersion containing fluorinated surfactants
   b) contact of the dispersion obtained in a) with an anionic exchanger;
   b1) separation of the dispersion from the anionic exchanger and recovery of a dispersion substantially fluorinated anionic surfactant free;
   c) optional dilution of the dispersion obtained in b1) with water; stirring of the dispersion and optional addition of a destabilizing electrolyte for obtaining aggregates/gels; granulation (coagulation) of the aggregates/gels by stirring, and separation of the fine powder of fluoropolymer from water by flotation;
   d) optionally, washing with water;
   e) drying of the fine powder.

2. The process according to claim 1, wherein, before step a), the pH of the fluoropolymer dispersion is adjusted at a pH value in the range from 7 to 12.

3. The process according to claim 1, wherein, in step a) the anionic polyelectrolytes are added in an amount comprised from 0.1% to 10%, in percent by weight referred to the fluoropolymer weight.

4. The process according to claim 1, wherein step c) comprises the following steps:
   optional dilution of the dispersion obtained in b1), when the concentration of the dispersion is higher than about 25% by weight of fluoropolymer, the concentration of the fluoropolymer in the dispersion used in step c) being from 2% to about 25% by weight, optionally and carrying out a filtration of the diluted dispersion to eliminate any particle aggregates;
   subsequent latex stirring by using a specific power from 0.5 to 10 kW/m$^3$, optional addition of an acid electrolyte to have the formation of a gel phase;
   stirring of the obtained gel by using a specific power from 1.5 to 10 kW/m$^3$; the stirring being maintained up to the complete granulation and flotation of the fine powder;
   stirring interruption and separation of the aqueous phase underlying the floated fine powder.

5. The process according to claim 1, wherein the destabilizing electrolyte usable in step c) is an acid electrolyte.

6. A process for obtaining fine powders of fluoropolymers substantially fluorinated surfactant free, comprising an anionic polyelectrolyte and organic and/or inorganic fillers, wherein the process according to claim 1 is used by adding in step c) to the fluoropolymer dispersion substantially fluorinated anionic surfactant free at least an organic and/or inorganic filler.

7. The process according to claim 1, wherein the fluoropolymers are selected from one or more classes selected from the group consisting of:
   tetrafluoroethylene (TFE) homopolymers and TFE copolymers having at least one unsaturation of ethylene type;
   TFE-based thermoprocessable fluoropolymers;
   VDF-based homopolymers and copolymers;
   CTFE-based homopolymers and copolymers;
   VDF-based fluoroelastomers:
   VDF/HFP, optionally containing TFE and/or vinylethers selected from perfluoroalkylvinylethers and/or per fluoroalkoxyalkylvinylethers; optionally containing hydrogen-containing olefins;
   TFE-based (per)fluoroelastomers:
   TFE copolymers with vinylethers selected from perfluoroalkylvinylethers and/or perfluoroalkoxyalkylvinylethers;
   TFE copolymers with hydrogen-containing olefins; and amorphous and/or crystalline fluoropolymers of TFE and/or VDF containing dioxole rings having 5-7 atoms.

8. The process according to claim 7, wherein in the TFE copolymers comprise monomers having at least one unsaturation of ethylene type and comprise hydrogen-containing and fluorinated comonomers.

9. The process according to claim 8, wherein the fluorinated comonomers are selected from the group consisting of:
   $C_3$-$C_8$ perfluoroolefins;
   $C_2$-$C_8$ hydrogen-containing fluoroolefins, selected from vinyl fluoride (VF), vinylidene fluoride (VDF), trifluoroethylene, $CH_2$=CH—$R_{fo}$ per fluoroalkylethylene wherein $R_{fo}$ is a $C_1$-$C_6$ perfluoroalkyl;
   $C_2$-$C_6$ chloro- and/or bromo- and/or iodo-fluoroolefins
   $CF_2$=$CFOR_{fo}$ (per)fluoroalkylvinylethers (PAVE), wherein $R_{fo}$ is a $C_1$-$C_6$ (per) fluoroalkyl;
   $CF_2$=$CFOX_0$ (per)fluorooxyalkylvinylethers, wherein $X_0$ is a $C_1$-$C_{12}$ alkyl, or a $C_1$-$C_{12}$ oxyalkyl, or a $C_1$-$C_{12}$ (per)fluorooxyalkyl having one or more ether groups; and
   fluorodioxoles.

10. The process according to claim 7, wherein the fluoropolymers are TFE copolymers or TFE homopolymers.

11. The process according to claim 1, wherein the anionic polyelectrolyte is a polymer having a linear or branched structure, with anionic groups distributed along the polymeric chain, optionally present also in the chain end groups.

12. The process according to claim 1, wherein the equivalent weight of the anionic polyelectrolyte is higher than 150 and lower than 2000.

13. The process according to claim 1, wherein the anionic polyelectrolytes contain in the molecule a number of anionic functional groups higher than or equal to 2, wherein said anionic functional groups are selected from the group consisting of: carboxylates, sulphates, sulphonates, phosphates, and phosphonates.

14. The process according to claim 1, wherein the anionic polyelectrolyte is an anionic homopolymer or copolymer of acrylic or vinylic monomers.

15. The process according to claim 14, wherein the acrylic comonomers are selected from the group consisting of meth(acrylamide); (meth)acrylic acid in the form of the corresponding salts; (meth)acrylonitrile, linear or branched $C_1$-$C_4$ hydroxyesters of the (meth)acrylic acid; $C_1$-$C_{12}$ alkyl(meth)acrylates; and the compounds of the following general formula:

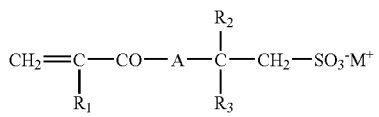

wherein: $R_1$ is H or $CH_3$; $R_2$ and $R_3$, equal or different, are H or $C_1$-$C_8$ alkyl, optionally branched; M is an alkaline or alkaline-earth metal or ammonium and A is NH, O, or $NCH_3$.

16. The process according to claim 1, wherein the anionic polyelectrolyte is a polyamic acid containing the following units:

amido-amic acid unit:

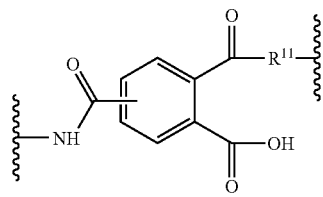

or amidoimidic unit:

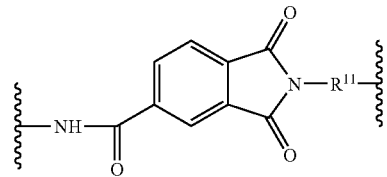

wherein $R^{11}$ is a divalent arylene radical.

* * * * *